US012247605B2

(12) United States Patent
Cross et al.

(10) Patent No.: US 12,247,605 B2
(45) Date of Patent: Mar. 11, 2025

(54) BLIND FASTENER

(71) Applicant: AIRBUS OPERATIONS LIMITED, Bristol (GB)

(72) Inventors: Matthew Cross, Bristol (GB); Andrew John Fay, Bristol (GB); Matthew Webster, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 849 days.

(21) Appl. No.: 17/412,761

(22) Filed: Aug. 26, 2021

(65) Prior Publication Data
US 2022/0128080 A1    Apr. 28, 2022

(30) Foreign Application Priority Data
Oct. 27, 2020    (GB) .................................... 2017009

(51) Int. Cl.
*F16B 29/00*    (2006.01)
*B64D 37/06*    (2006.01)
(52) U.S. Cl.
CPC .............. *F16B 29/00* (2013.01); *B64D 37/06* (2013.01)
(58) Field of Classification Search
CPC .. F16B 19/1054; F16B 19/1063; F16B 19/12; F16B 19/04; B29C 65/602; B29C 65/8322; E04B 1/1903
See application file for complete search history.

(56) References Cited

U.S. PATENT DOCUMENTS

| 2,415,560 | A | * | 2/1947 | Higley | .................... | F16B 19/12 411/19 |
| 2,787,185 | A | * | 4/1957 | Rea | ...................... | F16B 19/1063 411/49 |
| 2,795,989 | A | * | 6/1957 | Koenig | ............... | F16B 19/1063 29/523 |
| 2,884,099 | A | * | 4/1959 | Nenzell | ................. | F16B 19/008 29/523 |
| 3,136,203 | A | * | 6/1964 | Davis | .................. | F16B 19/1072 29/524.1 |
| 3,345,900 | A | * | 10/1967 | Villo | .................... | F16B 19/1063 411/41 |

(Continued)

FOREIGN PATENT DOCUMENTS

DE    10 2012 000 547    7/2013
DE    10 2012 009 673    9/2013
(Continued)

OTHER PUBLICATIONS

Extended European Search Report for Application No. GB 21192895. 7, eight pages, dated Feb. 15, 2022.

*Primary Examiner* — Daniel J Wiley
(74) *Attorney, Agent, or Firm* — Nixon & Vanderhye P.C.

(57) ABSTRACT

A blind fastener is disclosed having a head, a shaft with a tail, a tail of the blind fastener including the tail of the shaft and a sleeve surrounding the tail of the shaft, and a barrier secured to the tail of the blind fastener. The sleeve is configured to expand away from the tail of the shaft to form an expanded sleeve which is forced against a face of a workpiece to clamp the workpiece between the head and the expanded sleeve. The barrier is configured to be forced against the face of the workpiece to form a sealed cover around the tail of the blind fastener.

20 Claims, 10 Drawing Sheets

(56) References Cited

U.S. PATENT DOCUMENTS

| | | | | |
|---|---|---|---|---|
| 3,750,525 | A * | 8/1973 | Waters | F16B 19/008 411/181 |
| 3,785,241 | A * | 1/1974 | Fischer | F16B 13/061 411/38 |
| 3,789,728 | A * | 2/1974 | Shackelford | F16B 37/067 411/34 |
| 4,142,439 | A * | 3/1979 | Landt | F16B 19/1063 411/34 |
| 4,168,650 | A * | 9/1979 | Dahl | F16B 19/1063 411/43 |
| 4,376,604 | A * | 3/1983 | Pratt | F16B 19/1063 411/54 |
| 4,457,652 | A * | 7/1984 | Pratt | F16B 19/1063 29/523 |
| 4,659,271 | A * | 4/1987 | Pratt | F16B 19/1063 411/54 |
| 4,877,362 | A * | 10/1989 | Berecz | B29C 65/602 411/908 |
| 4,900,205 | A * | 2/1990 | Sadri | F16B 19/1063 411/42 |
| 6,036,418 | A * | 3/2000 | Stencel | F16B 19/1063 411/54.1 |
| 6,213,698 | B1 * | 4/2001 | Cosenza | F16B 19/1063 411/34 |
| 7,308,842 | B2 * | 12/2007 | Hufnagl | B25B 27/0007 81/55 |
| 8,434,984 | B2 * | 5/2013 | Toosky | F16B 19/05 411/362 |
| 8,979,453 | B2 * | 3/2015 | Hufnagl | F16B 19/1054 411/42 |
| 10,220,435 | B2 * | 3/2019 | Toosky | F16B 19/05 |
| 10,570,946 | B2 * | 2/2020 | Linsel | F16B 37/127 |
| 11,143,226 | B2 * | 10/2021 | Vovan | B23P 19/062 |
| 2004/0231467 | A1 * | 11/2004 | Hufnagl | F16B 23/0061 81/55 |
| 2005/0002760 | A1 * | 1/2005 | Hayashi | F16B 19/1054 411/501 |
| 2008/0075555 | A1 * | 3/2008 | March | F16B 39/026 411/361 |
| 2009/0053006 | A1 * | 2/2009 | Hufnagl | F16B 19/1054 81/436 |
| 2012/0263556 | A1 * | 10/2012 | Pratt | F16B 19/1054 411/361 |
| 2014/0047699 | A1 * | 2/2014 | Pratt | F16B 19/1063 411/38 |
| 2014/0130335 | A1 * | 5/2014 | Bickford | F16B 19/1072 29/525.02 |
| 2014/0201974 | A1 * | 7/2014 | Mitchell | B21J 15/04 29/524.1 |
| 2015/0010370 | A1 * | 1/2015 | Pratt | F16B 19/1063 411/43 |
| 2015/0196951 | A1 * | 7/2015 | Bigot | B21J 15/04 29/243.526 |
| 2016/0215804 | A1 * | 7/2016 | Hufnagl | F16B 19/1054 |
| 2018/0238372 | A1 * | 8/2018 | Villet | F16B 19/10 |
| 2019/0161206 | A1 * | 5/2019 | Dobbin | B64D 45/02 |
| 2019/0186522 | A1 * | 6/2019 | Pailhories | F16B 19/1054 |

FOREIGN PATENT DOCUMENTS

| | | |
|---|---|---|
| EP | 0 515 066 | 11/1992 |
| EP | 1 503 089 | 2/2005 |
| GB | 1 523 216 | 8/1978 |

* cited by examiner

BLIND FASTENER

CROSS RELATED APPLICATION

This application claims priority to United Kingdom Patent Application GB 2017009.8, filed Oct. 27, 2020, the entire content of which is hereby incorporated by reference.

FIELD OF THE INVENTION

The present invention relates to a blind fastener, a method of installing a blind fastener, and a joint including a blind fastener.

BACKGROUND OF THE INVENTION

Single-sided ("blind") fasteners are more prone to outgassing than more conventional double-sided fasteners. The outgassing problem can be solved to some extent by providing an interference fit between the fastener and the bore wall, but in some safety-critical environments (for instance an aircraft fuel tank) it may be necessary to provide an additional degree of protection.

A spark containment cap for a blind fastener is disclosed in US 2019/0161206. A sealed cavity is formed between a cap and a structure. A joint is then assembled by inserting a blind fastener through an aperture from an opposing side of the structure to the cap. The blind fastener is then engaged to form the joint. With such an arrangement, the joint may be formed during final assembly with access to only one side of the structure.

SUMMARY OF THE INVENTION

A first aspect of the invention provides a blind fastener comprising: a head; a shaft with a tail; a tail of the blind fastener comprising the tail of the shaft and a sleeve surrounding the tail of the shaft; and a barrier secured to the tail of the blind fastener, wherein the sleeve is configured to expand away from the tail of the shaft to form an expanded sleeve which is forced against a face of a workpiece to clamp the workpiece between the head and the expanded sleeve, and wherein the barrier is configured to be forced against the face of the workpiece to form a sealed cover around the tail of the blind fastener.

Optionally the barrier comprises a skirt with a skirt rim, and the skirt is configured to force the skirt rim against the face of the workpiece to form a seal between the skirt rim and the face of the workpiece.

Optionally the barrier comprises a cap or sheath with a skirt and an apex, the tail of the blind fastener has sides and an end, the sides of the tail are covered by the skirt, and the end of the tail is covered by the apex.

Optionally the barrier is configured to deform radially towards or away from the tail of the shaft.

Optionally the barrier is configured to expand plastically and/or elastically away from the tail of the shaft to form an expanded barrier.

Optionally the barrier has a skirt with a skirt rim which is separated from the sleeve by a gap, and the skirt is configured to contract towards the sleeve to at least partially close the gap.

Optionally the barrier is secured to the tail of the blind fastener by an interference fit, an adhesive bond, or a snap-fit joint.

Optionally the barrier has an apex, and the blind fastener further comprises an axial cavity between the apex of the barrier and the tail of the blind fastener.

Optionally the blind fastener further comprises a sealant between the barrier and the tail of the blind fastener.

Optionally the barrier comprises a skirt and the blind fastener further comprises a pocket between the skirt and the tail of the blind fastener.

A further aspect of the invention provides a method of installing a blind fastener, the blind fastener comprising: a head; a shaft with a tail; a tail of the blind fastener comprising the tail of the shaft and a sleeve surrounding the tail of the shaft; and a barrier secured to the tail of the blind fastener, the method comprising the steps of: a) passing the barrier and the tail of the blind fastener through a workpiece; and b) tightening the blind fastener so that: the sleeve expands away from the tail of the shaft to form an expanded sleeve; the expanded sleeve is forced against a face of the workpiece to clamp the workpiece between the head and the expanded sleeve, and the barrier is forced against the face of the workpiece so that the barrier forms a sealed cover around the tail of the blind fastener.

Optionally the barrier comprises a skirt with a skirt rim, and the skirt rim is forced against the face of the workpiece to form a seal between the skirt rim and the workpiece.

Optionally as the sleeve expands away from the tail of the shaft to form the expanded sleeve, the barrier expands elastically or plastically away from the tail of the shaft to form an expanded barrier.

Optionally the barrier is in an expanded state before step a.; the barrier is in an elastically compressed state as it passes through the workpiece in step a.; and the barrier springs at least partially back towards its expanded state after it has passed through the workpiece in step a.

Optionally the barrier comprises a skirt and the blind fastener comprises a pocket between the skirt and the tail of the blind fastener, wherein an uncured sealant flows into the pocket as the blind fastener is tightened, and the uncured sealant cures in the pocket to bond the skirt to the tail of the blind fastener and/or to bond the skirt to the workpiece.

A further aspect of the invention provides a joint comprising: a workpiece; a blind fastener comprising: a head; a shaft with a tail; a tail comprising the tail of the shaft and a sleeve surrounding the tail of the shaft; and a barrier secured to the tail of the blind fastener, wherein the sleeve has an expanded part in contact with a face of a workpiece to clamp the workpiece between the head and the sleeve, wherein the barrier comprises a skirt with a skirt rim in contact with the face of the workpiece to form a sealed cover around the tail of the blind fastener, and wherein the skirt rim is held by the tail of the blind fastener in a state of compression which causes the skirt rim to apply a sealing force to the face of the workpiece.

Optionally the joint further comprises a sealed air pocket between the skirt and the tail of the blind fastener.

Optionally the joint further comprises a cured sealant which bonds the skirt to the tail of the blind fastener and/or bonds the skirt to the workpiece.

A further aspect of the invention provides an aircraft fuel tank comprising a joint according to the previous aspect, wherein the aircraft fuel tank has an interior, and the skirt and tail of the blind fastener are within the interior of the aircraft fuel tank.

A further aspect of the invention provides an aircraft comprising an aircraft fuel tank according to the previous aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
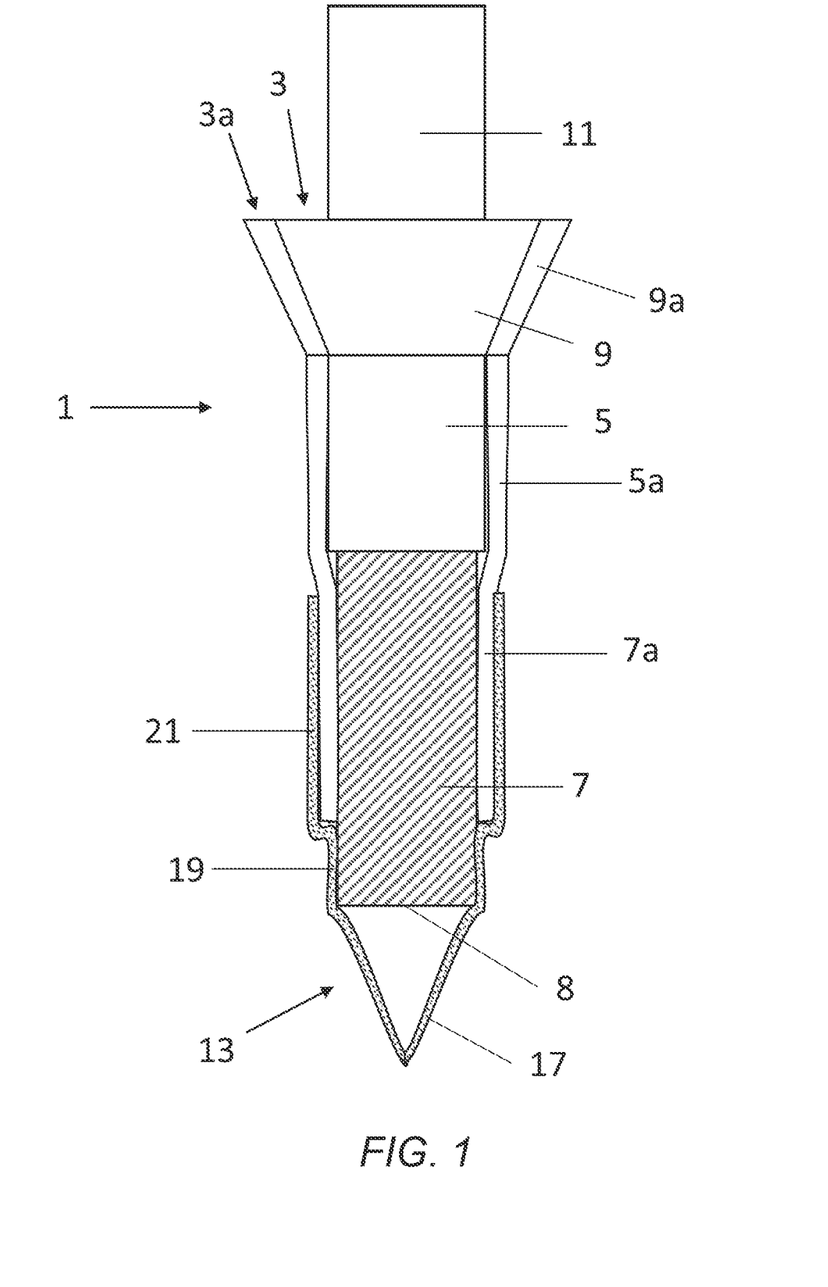
FIG. 1 shows a blind fastener according to a first embodiment of the invention.

A blind fastener 1 shown in FIG. 1 comprises a metal shaft 3 with an unthreaded body 5, an externally threaded tail 7 and a frustoconical head 9. A pin 11 is attached to the head 9 of the shaft 3. The shaft 3 is surrounded by a metal sleeve 3a. The sleeve comprises a frustoconical head 9a surrounding the head 9 of the shaft 3, a cylindrical body 5a surrounding the body 5 of the shaft 3, and a tail 7a surrounding the tail 7 of the shaft 3. The tail 7a of the sleeve 3a has an internal thread which engages with the external thread of the tail 7 of the shaft 3. The head 9a and body 5a of the sleeve 3a are unthreaded.

In general terms, the blind fastener 1 comprises a head (the head 9 of the shaft 3 and the head 9a of the sleeve 3a); a body (the body 5a of the sleeve 3a and the body 5 of the shaft 3); and a tail (the tail 7 of the shaft 3 and the tail 7a of the sleeve 3a).

A barrier 13 is fitted to the tail of the blind fastener 7, secured to the tail 7a of the sleeve 3a. The barrier 13 is an integrated part of the blind fastener 1—carried by the tail 7, 7a of the blind fastener 1.

The barrier 13 comprises a sheath with a conical apex 17, a cylindrical sheath body 19 and a widened cylindrical skirt 21. The sides of the tail 7, 7a of the blind fastener 1 are covered by the skirt 21 and the sheath body 19, and the end face 8 of the tail 7, 7a of the blind fastener 1 is covered by the cap apex 17.

As will now be described below with reference to FIGS. 2A-C, the sleeve 3a is configured such that a relative rotation between the threads causes the tail 7a of the sleeve 3a to expand away from the tail 7 of the shaft 3 to form an expanded sleeve with a flange 25 which is forced against a reverse face 23a of a workpiece 23 to clamp the workpiece between the head 9, 9a of the blind fastener and the expanded sleeve. The barrier 13 is also configured to be forced against the reverse face 23a of the workpiece 23 by the tail 7, 7a of the blind fastener 1 to form a sealed cover around the tail 7, 7a of the blind fastener.

The blind fastener 1 is installed by first passing the barrier 13 and the tail 7, 7a of the blind fastener 1 through a workpiece 23. The blind fastener 1 is shown partly inserted in FIG. 2A and fully inserted in FIG. 2B.

Next the blind fastener 1 is tightened by a tool (not shown). The tool has a first part which grips the pin 11, and a second part which grips the head 9a of the sleeve 3a. The first part of the tool rotates the pin 11, which in turn rotates the shaft 3. The second part of the tool holds the head 9a of the sleeve 3a to prevent the sleeve from rotating. Thus there is a relative rotation between the external threads of the tail 7 of the shaft 3 and the internal threads of the tail 7a of the sleeve 3a. This relative rotation drives the tail 7a of the sleeve 3a axially towards the workpiece 23 so that it deforms plastically and expands radially away from the tail 7 of the shaft 3 to form an expanded sleeve with a folded flange 25 shown in FIG. 2C. There may be a knurling on the sleeve 3a so it deforms in a predictable way.

As the blind fastener 1 is tightened further, the flange 25 is forced against the reverse face 23a of the workpiece 23 to clamp the workpiece 23 between the head 9, 9a and the expanded sleeve.

The barrier 13 is configured to expand away from the tail 7 of the shaft 3 to form an expanded barrier with a flared part 14 of the skirt 21 as the sleeve 3a expands away from the tail 7 of the shaft 3. Thus as the tail 7a of the sleeve 3a expands away from the tail 7 of the shaft 3 to form the expanded sleeve, the barrier 13 is forced by the sleeve 3a so that it also expands radially away from the tail 7 of the shaft 3 to form an expanded barrier shown in FIG. 2C. Like the sleeve 3a, the barrier 13 deforms plastically as it expands radially away from the tail 7 of the shaft 3.

The barrier 13 is typically made of a hard electrically insulating (non-conducting) material that can be plastically deformed and has low friction so it can be passed through the workpiece easily. For instance the barrier 13 may be made of a polymer (reinforced or not).

Figure 2A:
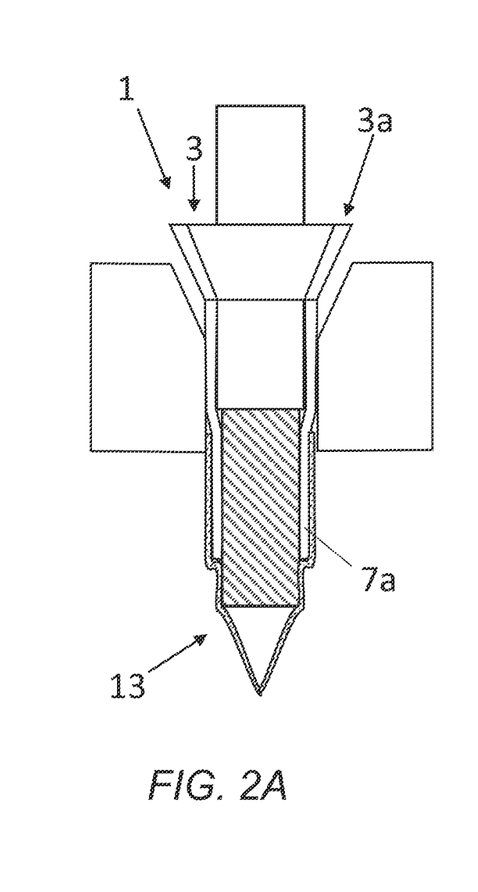
FIGS. 2A-2C show a method of installing the blind fastener of FIG. 1 into a workpiece.
Figure 2B:
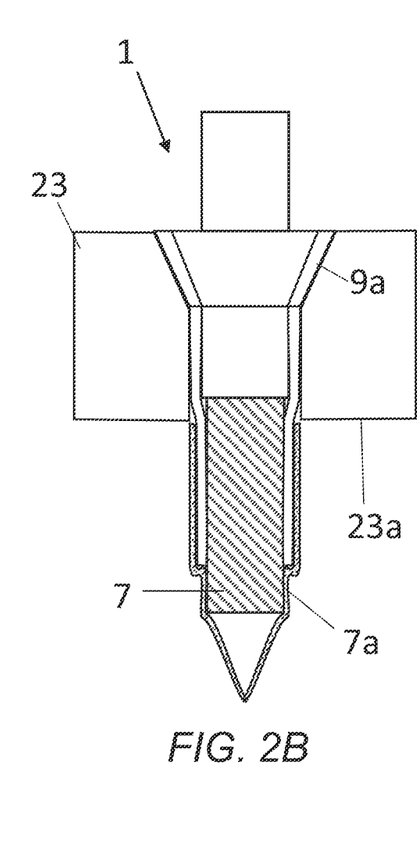
Figure 2C:
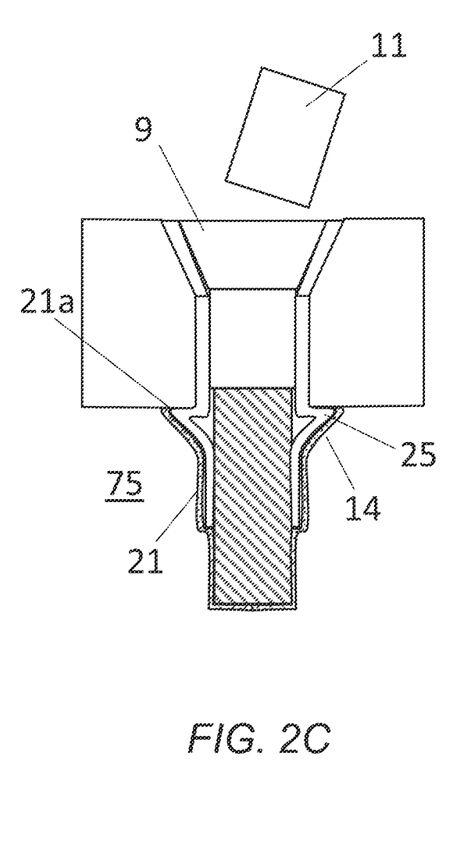

The expanded barrier of FIG. 2C is also pulled axially by the tail 7a of the sleeve 3a so that the flared part 14 of the skirt 21 is forced against the reverse face 23a of the workpiece 23 and the barrier 13 forms a sealed cover around the tail 7, 7a of the blind fastener 1, providing a spark containment barrier. The flared part 14 of the skirt 21 comprises a skirt rim 21a which is forced against the reverse face 23a of the workpiece 23 to form an air-tight seal between the skirt rim 21a and the reverse face 23a of the workpiece 23. In this case the rim is an edge of the barrier 13.

The barrier 13 may be secured to the tail 7a of the sleeve 3a by an interference fit, an adhesive bond, a thermoplastic weld or a snap-fit joint. Alternatively the barrier 13 may be held mechanically in a notch or recess in the tail 7a of the sleeve, or carried by another part (such as a nut) fitted onto the tail 7a of the sleeve. In general the barrier 13 may be secured to the tail 7, 7a of the blind fastener 1 by any connection which prevents the barrier 13 from rotating with the shaft 3 and enables the tail 7, 7a of the blind fastener 1 to force the skirt rim 21a against the reverse face 23a of the workpiece 23.

Optionally the sheath body 19 may have an internal thread which engages with the external thread of the tail 7 of the shaft 3. In this case the relative rotation drives the sheath body 19 axially towards the workpiece 23. Alternatively the sheath body 19 may be unthreaded.

The tool continues to rotate the pin 11 until the blind fastener 1 is fully tightened, the increased torque causing the pin 11 to shear off as shown in FIG. 2C.

In the fully tightened joint of FIG. 2C, the sleeve 3a has an expanded flange 25 in contact with the reverse face 23a of a workpiece 23 to clamp the workpiece 23 between the head 9, 9a and the sleeve 3a, and the skirt rim 21a is in contact with the reverse face 23a of the workpiece 23 to form a sealed cover around the tail 7, 7a of the blind fastener 1. The majority of the deformation of the barrier 13 is a plastic deformation, but there is also an element of elastic deformation as the fastener is tightened, so that the barrier 13 in the fully tightened joint is held by the tail 7, 7a of the blind fastener 1 in a state of compression. This causes the skirt rim 21a to apply a sealing force to the reverse face 23a of the workpiece 21, inhibiting leakage of gas between the skirt rim 21a and the reverse face 23a of the workpiece 23.

The barrier 13 may expand away from the sleeve 3a to form an air pocket between the barrier 13 and the sleeve 3a. Alternatively the barrier 13 may remain tightly in contact with the sleeve 3a so there is no air pocket, or a minimal air gap may open up towards the skirt rim 21a.

As demonstrated in FIGS. 2A-C the fastener 1 is a "blind" fastener: that is, a fastener which can be installed into a workpiece with access to only one side of the workpiece. The blind fastener 1 provides an improvement over the blind fastener is disclosed in US 2019/0161206. In US 2019/0161206 the cap must be fixed to the reverse face of the workpiece in a separate cap installation process before the blind fastener is inserted. The blind fastener 1 incorporates an integrated spark containment barrier 13 which means that access to the reverse face of the workpiece is not required, and the barrier 13 can be installed along with the rest of the blind fastener 13 in a single installation process.

Figure 3:
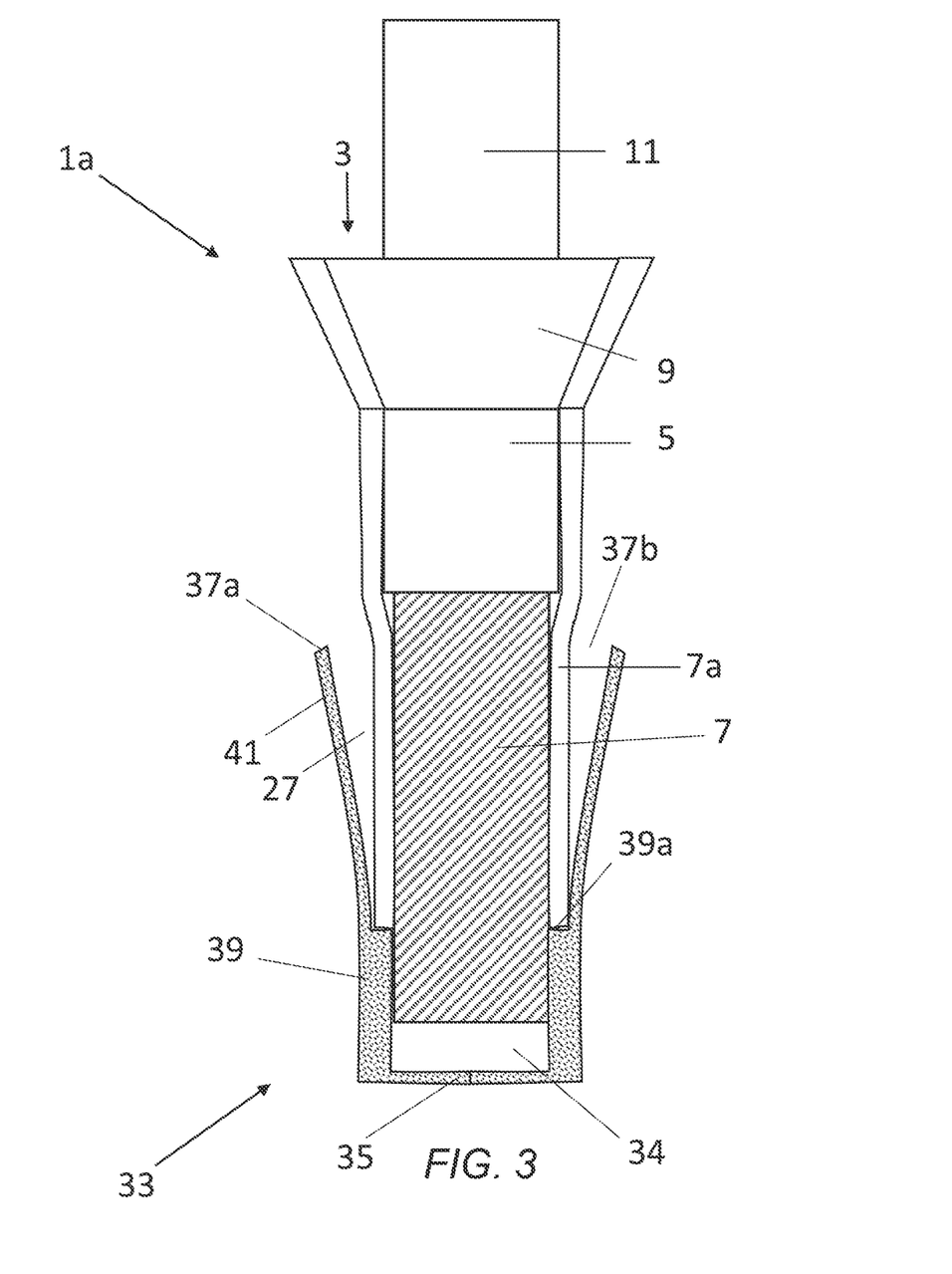
FIG. 3 shows a blind fastener according to a second embodiment of the invention.

FIG. 3 shows a blind fastener 1a with a different barrier 33 fitted. The blind fastener has many features in common with the blind fastener 1 of FIG. 1, and the same features are given the same reference number.

In this case the barrier 33 comprises a cap with a flat cap apex 35, and a skirt with a cylindrical part 39 and a flared part 41. The skirt 39, 41 has an annular skirt rim 37a. The cylindrical part 39 of the skirt has an annular seat 39a which contacts the edge of the tail 7a of the sleeve 3a. The sides of the tail 7, 7a of the blind fastener 1a are covered by the skirt 39, 41 and the tail 7 of the shaft is covered by the cap apex 35. There is an axial air cavity 34 between the end face of the tail 7 of the shaft and the cap apex 35.

Figure 4A:
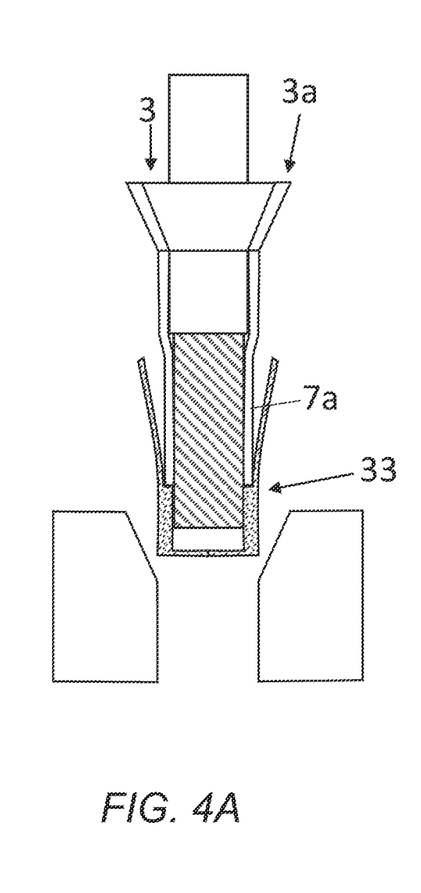
FIGS. 4A to 4C show a method of installing the blind fastener of FIG. 3 into a workpiece.
Figure 4B:
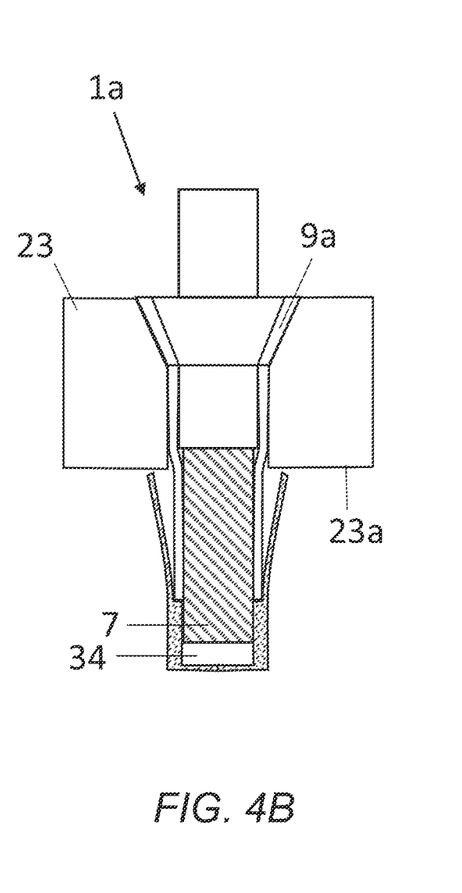
Figure 4C:
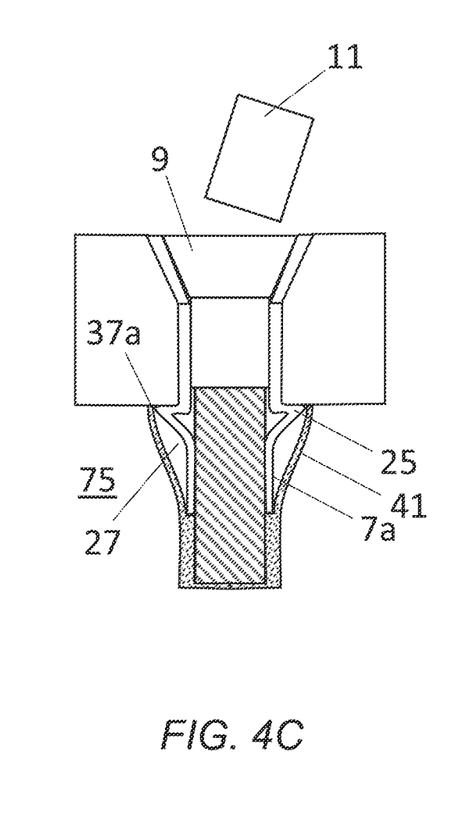

The annular seat 39a of the skirt may be secured to the edge of the tail 7a of the sleeve 3a by an adhesive bond, a thermoplastic weld, or a snap-fit joint. Alternatively the barrier 33 may be held mechanically in a notch or recess in the tail 7 of the shaft 3, or carried by another part (such as a nut) fitted onto the tail 7a of the sleeve 3a. In general the barrier 33 may be secured to the tail 7, 7a of the blind fastener 1a by any connection which prevents the barrier 33 from rotating with the shaft 3 and enables the tail 7, 7a of the blind fastener 1a to force the skirt rim 37a against the reverse face 23a of the workpiece 23 as shown in FIG. 4C. Optionally a portion of the flared part 41 of the skirt 37 may be secured to the outer face of the tail 7a of the sleeve 3a.

The skirt rim 37a is separated from the sleeve 3a by a gap 37b to provide an air pocket 27 between the skirt and the tail of the blind fastener. The flared part 41 of the skirt is configured to contract elastically towards the sleeve 3a to at least partially close the gap 37b to enable the barrier 33 to be pushed through a workpiece 23 as shown in FIGS. 4A and 4B. Thus the barrier 33 is configured to contract elastically towards the sleeve 3a to at least partially close the gap as it passes through the workpiece.

As shown in FIG. 4A, the barrier 33 is in an expanded state before being passed through the workpiece 23. As the barrier 33 passes through the workpiece 23 it is configured to deform radially towards the tail 7, 7a of the fastener, so it is an elastically compressed state as it passes through the workpiece 23. The barrier 33 then springs back to its expanded state after it has passed through the workpiece 23 as shown in FIG. 4B, re-opening the gap 37b and associated air pocket 27 between the sleeve 3a and the skirt rim 37a.

The barrier 33 is typically made of a hard electrically insulating (non-conductive) material that can be elastically deformed and has low friction so it can be passed through the workpiece 23 easily. For instance the barrier 33 may be made of a polymer (reinforced or not).

In the fully tightened joint of FIG. 4C, the sleeve 3a has an expanded flange 25 in contact with the reverse face 23a of the workpiece 23 to clamp the workpiece 23 between the head 9, 9a and the sleeve 3a, and the skirt rim 37a is in contact with the reverse face 23a of the workpiece 23 to form a sealed cover around the tail 7, 7a of the blind fastener 1a. The majority of the deformation of the barrier 33 is an elastic deformation, so that the barrier 33 in the fully tightened joint is held by the tail 7, 7a of the blind fastener 1a in a state of compression, and the flared part 41 of the skirt has an outwardly bowed shape shown in FIG. 4C. This causes the skirt rim 37a to apply a sealing force to the reverse face 23a of the workpiece 23, inhibiting leakage of gas between the skirt rim 37a and the reverse face 23a of the workpiece 23. In the fully tightened joint of FIG. 4C the air pocket 27 between the barrier 33 and the tail 7, 7a of the blind fastener 1a is sealed.

Figure 4D:
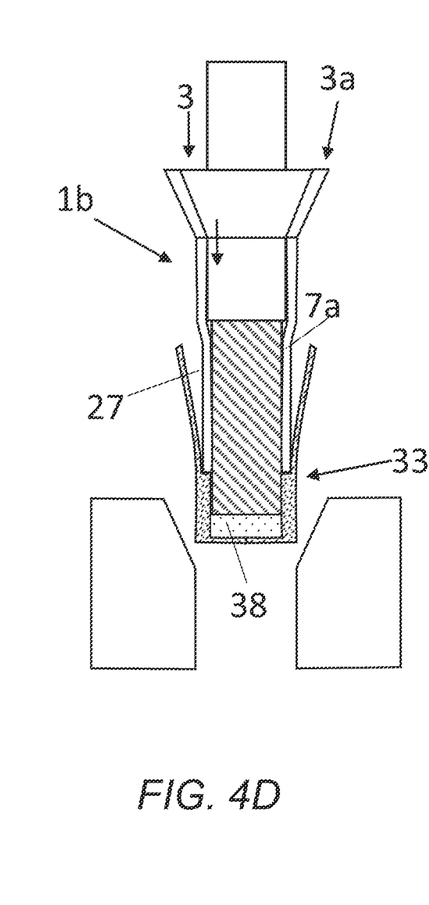
FIGS. 4D to 4F show a method of installing the blind fastener of FIG. 3 using sealant.
Figure 4E:
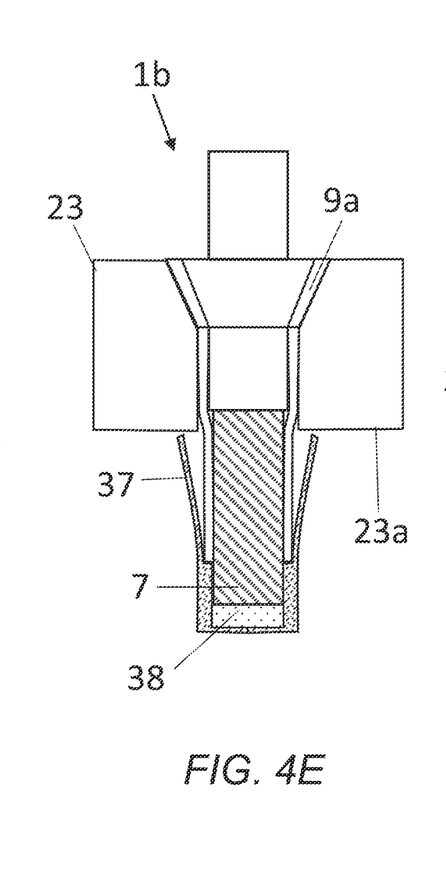
Figure 4F:
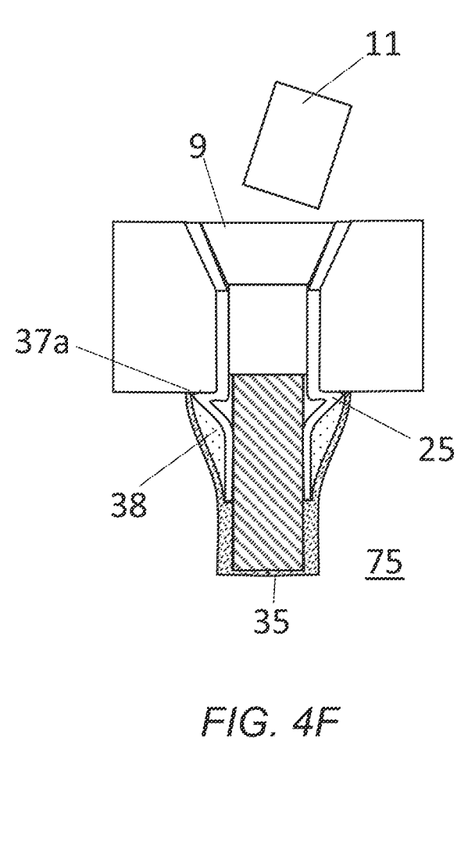

The axial air cavity 34 gives the clearance required to enable the cap to move towards the workpiece 23 as shown in FIGS. 4B and 4C. In an alternative embodiment shown in FIGS. 4D-4F, a blind fastener 1b is shown with the axial air cavity 34 filled with a sealant material 38 before the cap 33 is installed. As the cap moves towards the workpiece 23, the sealant 38 escapes the cavity through grooves in the tail 7, 7a of the fastener, then flows into the air pocket 27 between the skirt and the tail 7, 7a of the blind fastener 1b as shown in FIG. 4F.

Tightening the fastener compresses the sealant in the pocket 27 and forces the sealant against the workpiece 23 and/or against the tail 7a of the sleeve, providing an enhanced seal. The sealant in the pocket 27 then cures to bond the cap 33 to the reverse face 23a of the workpiece 23 and/or to bond the cap to the tail 7a of the sleeve. A small amount of sealant 38 may also remain in the axial cavity 34 at the end of the blind fastener, and when this cures it will bond the cap apex 35 to the end face 8 of the tail 7 of the shaft 3.

Figure 5:
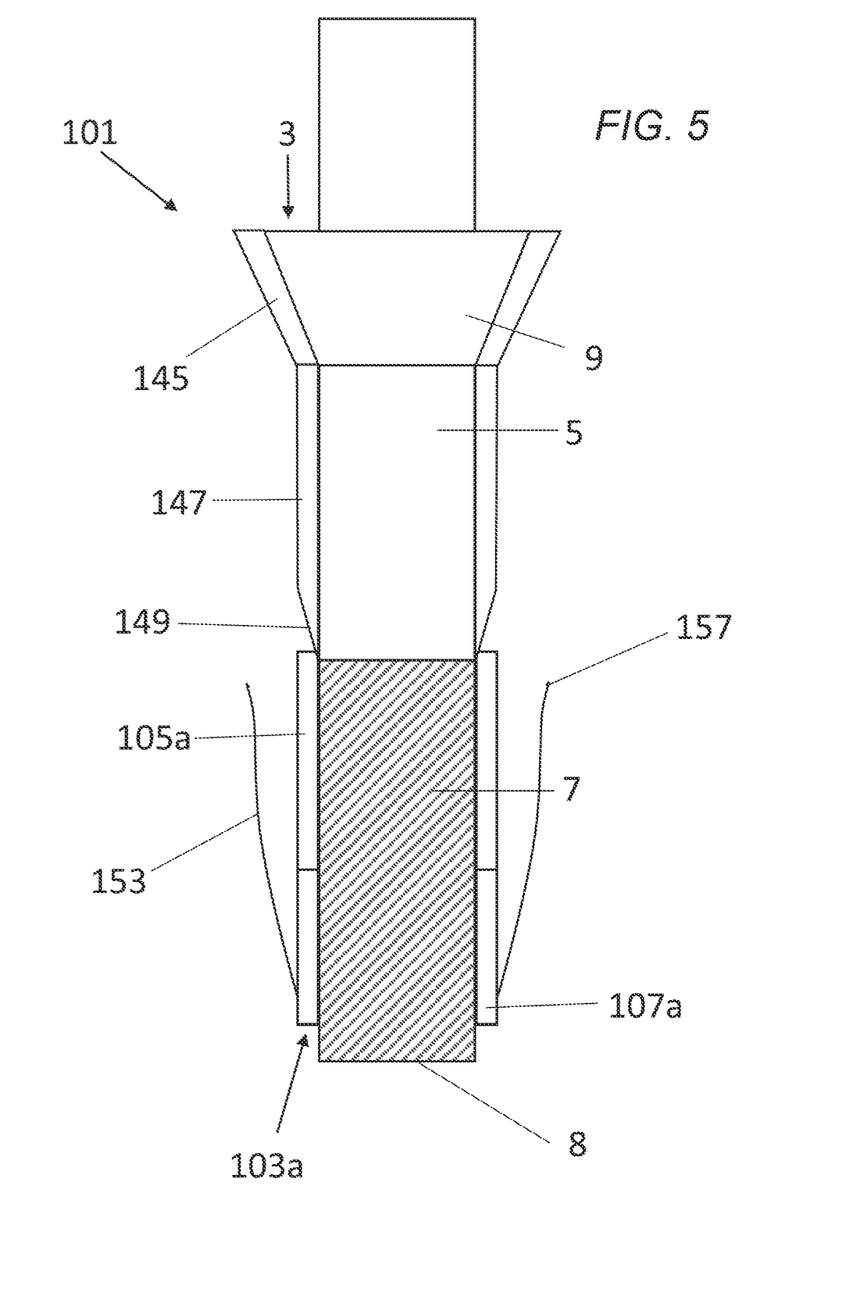
FIG. 5 shows a blind fastener according to a third embodiment of the invention.

A blind fastener 101 shown in FIG. 5 is similar to the blind fastener 1a of FIG. 3. Identical parts are given the same reference number and will not be described again.

The externally threaded tail 7 of the shaft 3 is surrounded by a metal sleeve 103a which has an internally threaded tail 107a and an unthreaded body 105a. The internal thread of the tail 107a of the sleeve 103a engages with the external thread of the tail 7 of the shaft 3. The head 9 and body 5 of the shaft 3 are surrounded by a collar with a frustoconical head 145, a cylindrical body 147 and a tapered tip 149 which has axial ridges or grooves (not shown). The tapered tip 149 is fitted into the unthreaded body 105a of the sleeve 103a as an interference fit.

Thus the blind fastener 101 comprises a head (the head 9 of the shaft and the head 145 of the collar); a body (the body 147 and tip 149 of the collar, and the body 5 of the shaft 3); and a tail (the tail 7 of the shaft 3, and the body 105a and tail 107a of the sleeve 103a).

A barrier 153 is fitted to the tail 7, 105a, 107a of the blind fastener 101, secured to the tail 107a of the sleeve 103a. The sides of the tail of the blind fastener 101 are covered by the barrier 153. Unlike the previous embodiments, the barrier 153 consists only of a flared skirt, so the end face 8 of the tail of the shaft is not covered by the barrier 153.

The barrier 153 may be secured to the tail 107a of the sleeve 103a by an interference fit, an adhesive bond, a thermoplastic weld or a snap-fit joint. Alternatively the barrier 153 may be held mechanically in a notch or recess in the tail 107a of the sleeve 103a, or carried by another part (such as a nut) fitted onto the tail 107a of the sleeve 103a. In general the barrier 153 may be secured to the tail of the blind fastener by any connection which prevents the barrier 153 from rotating with the shaft 103 and enables the tail of the blind fastener to force the skirt rim 157 against the reverse face 123a of the workpiece 123.

The sleeve 103a is configured such that a relative rotation between the threads causes the body 105a of the sleeve 103a to expand away from the tail 7 of the shaft 3 to form an expanded sleeve with a folded flange 125 which is forced against the reverse face 23a of the workpiece 23 to clamp the workpiece between the head 9, 145 and the flange 125 of the expanded sleeve. The barrier 153 is also configured to be forced against the face of the workpiece 123 by the tail of the blind fastener 101 to form a sealed cover around the tail of the blind fastener 101.

Figure 6A:
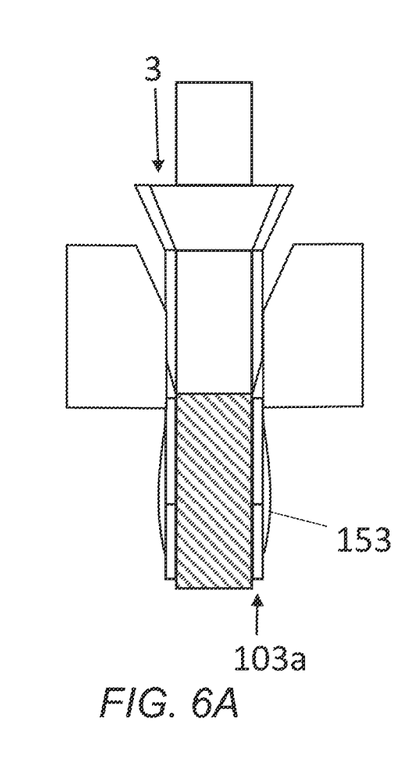
FIGS. 6A to 6C show a method of installing the blind fastener of FIG. 5 into a workpiece.
Figure 6B:
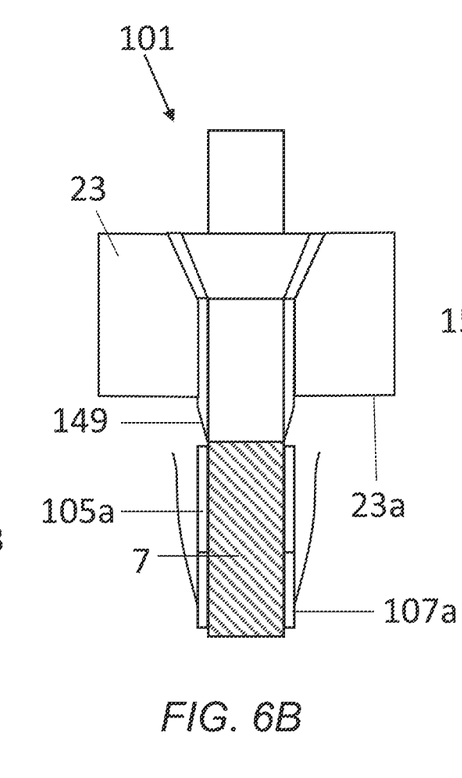

As shown in FIG. 5, the barrier 153 is in an expanded state before being passed through the workpiece 123. As the barrier 153 passes through the workpiece 123 it is configured to deform radially towards the tail 7 of the shaft 3, so it is an elastically compressed state as it passes through the workpiece 23. FIG. 6A shows the barrier 153 in such a compressed state, although it has started to spring back since most of it has already passed through. The barrier 153 then springs back to its fully expanded state after it has passed through the workpiece 123 as shown in FIG. 6B, re-opening the gap between the sleeve 103a and the skirt rim 157.

Figure 6C:
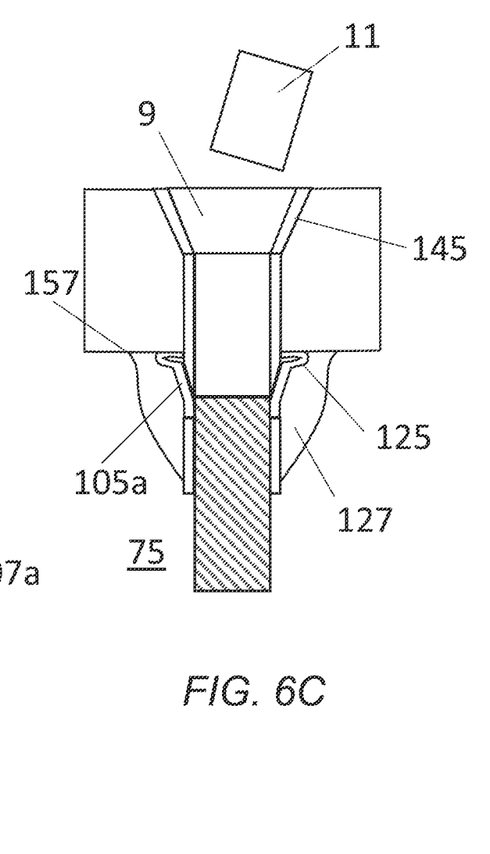

In the fully tightened joint, the barrier 153 is held by the tail of the blind fastener 101 in a state of compression, with a compressed shape shown in FIG. 6C. This causes the skirt rim 157 to apply a sealing force to the reverse face 23a of the workpiece 23, inhibiting leakage of gas between the skirt rim 157 and the reverse face 23a of the workpiece 23.

In the fully tightened joint of FIG. 6C there is a sealed air pocket 127 between the barrier 153 and the tail of the blind fastener 101. This provides a sealed chamber of compressible gas that can contain any ignition hazard resulting from the fastener 101.

As the fastener 101 is tightened, the body 105a of the sleeve 103a rides over the tapered tip 149 of the collar, as shown in FIG. 6C. The ridges or grooves in the tapered tip 149 of the collar grip the body 105a of the sleeve 103a and prevent it from rotating with the shaft 3.

Figure 7A:
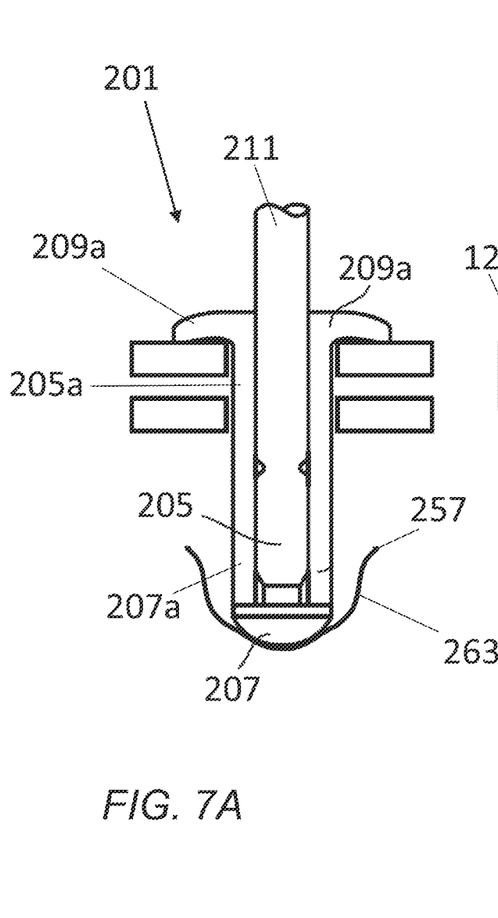
FIGS. 7A to 7C show a blind fastener according to a fourth embodiment of the invention and a method of installing the blind fastener into a workpiece.
Figure 7B:
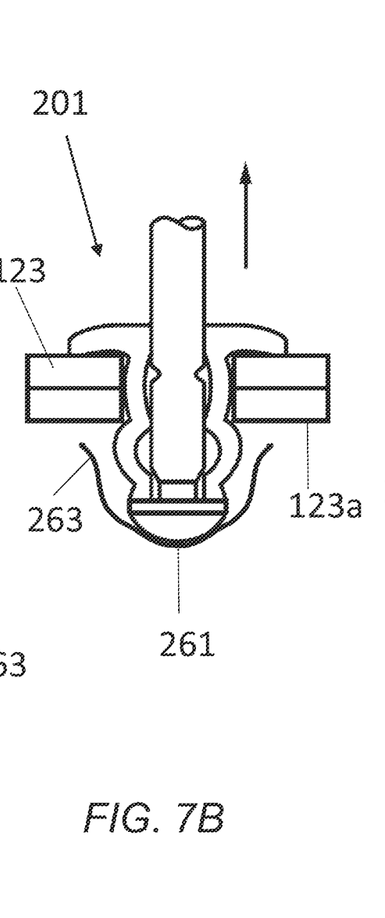
Figure 7C:
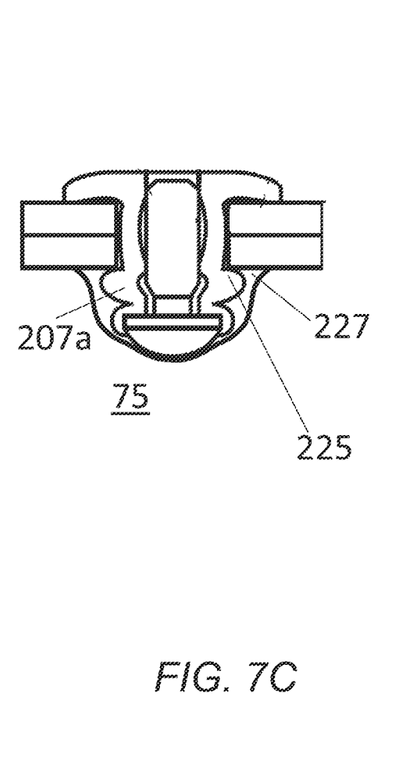

In the embodiments above, the blind fastener 1, 1a, 101 is tightened by rotating the shaft 3. FIGS. 7A-C shown an alternative embodiment in which the blind fastener is tightened by pulling the shaft.

The blind fastener 201 of FIGS. 7A-C comprises a metal shaft with a detachable pin 211, a body 205, and a domed mandrel 207. The shaft is surrounded by a metal sleeve with a head 209a, a body 205a and a tail 207a.

The blind fastener 201 comprises a head (the head 209a of the sleeve); a body (the body 205a of the sleeve and the body 205 of the shaft); and a tail (the mandrel 207 and the tail 207a of the sleeve).

A barrier 253 is fitted to the tail of the blind fastener 201 as shown in FIG. 7A, secured to the mandrel 207. The barrier 253 comprises a cap with a domed cap apex 261, and a flared skirt 263 with a skirt rim 257.

The domed cap apex 261 may be secured to the mandrel 207 by an adhesive bond or a thermoplastic weld. Alternatively the barrier 253 may be held mechanically to the mandrel 207, for instance by a snap-fit joint, or by a clamp or other fastener.

As shown in FIGS. 7A-C, the sleeve is configured such that as the pin 211 is pulled back, the tail 207a of the sleeve is compressed by the mandrel 207 which causes the sleeve to expand away from the shaft to form an expanded sleeve with a flange 225 which is forced against the reverse face 123a of a workpiece 123 to clamp the workpiece between the head 209a of the blind fastener and the flange 225 of the expanded sleeve. The skirt 263 is also configured to be forced against the reverse face 123a of the workpiece 123 by the mandrel 207 to form a sealed cover around the tail 207, 207a of the blind fastener.

The skirt 263 is in an expanded state before being passed through the workpiece 123. As the skirt 263 passes through the workpiece 123 it is configured to deform radially towards the tail of the blind fastener, so it is an elastically compressed state as it passes through the workpiece 123. The skirt 263 then springs back to its expanded state after it has passed through the workpiece 123 as shown in FIG. 7A, re-opening the gap between the sleeve 207a and the skirt rim 257.

In the fully tightened joint of FIG. 7C, the sleeve has an expanded flange 225 in contact with the reverse face 123a of a workpiece 123 to clamp the workpiece between the head 209a and the flange 225, and the skirt rim 257 is in contact with the reverse face 123a of the workpiece to form a sealed cover around the tail 207, 207a of the blind fastener 201. The skirt 263 in the fully tightened joint is held by the tail of the blind fastener in a state of compression. This causes the skirt rim 257 to apply a sealing force to the reverse face 123a of the workpiece 123, inhibiting leakage of gas between the skirt rim 257 and the reverse face 123a of the workpiece 123.

In the fully tightened joint of FIG. 7C there is a sealed air pocket 227 between the barrier 263 and the tail of the blind fastener. This provides a sealed chamber of compressible gas that can contain any ignition hazard resulting from the fastener.

Figure 8:
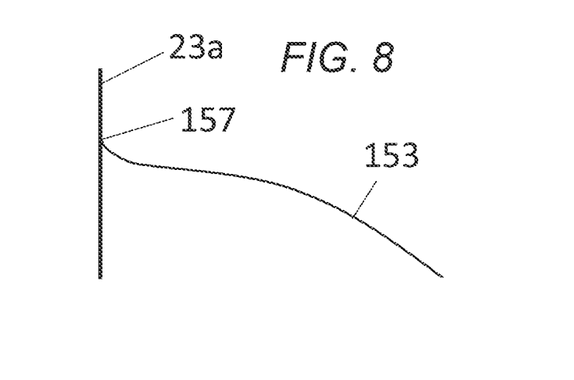
FIG. 8 shows the rim of the barrier of the blind fastener of FIG. 5 contacting the face of the workpiece.

In the embodiments shown above, the edge of the skirt 21, 41, 153, 263 provides the skirt rim which is in contact with the reverse face of the workpiece. FIG. 8, by way of example, shows the skirt rim 157 of FIG. 6C in the fully tightened joint.

Figure 9:
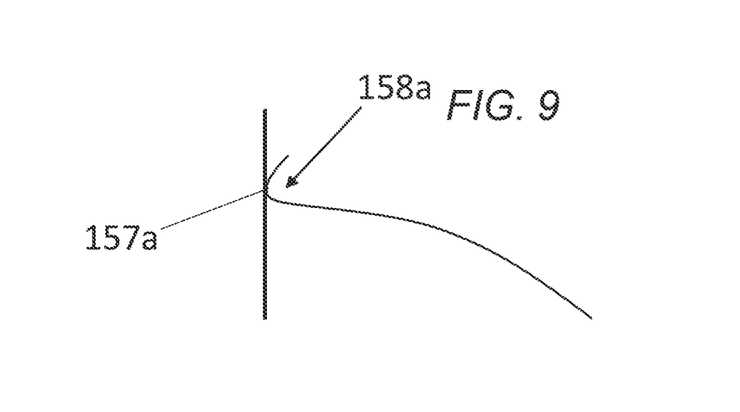
FIG. 9 shows an alternative barrier with an outwardly bent rim.
Figure 10:
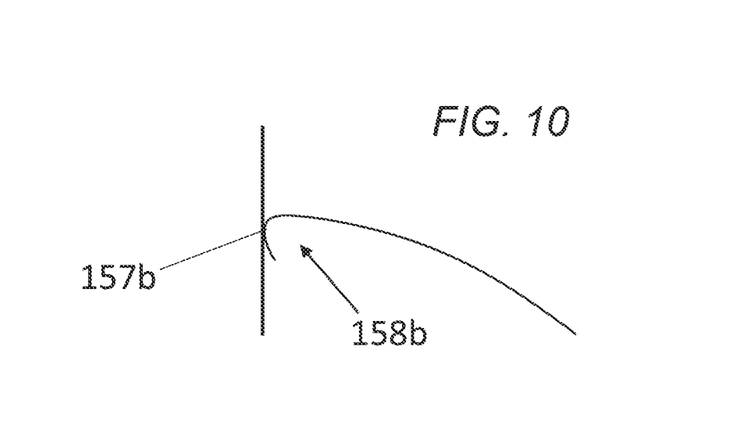
FIG. 10 shows an alternative barrier with an inwardly bent rim.

In other embodiments, the edge of the skirt may be bent back inwardly or outwardly to form a rim with a lip. FIG. 9 shows an example of an outwardly bent lip 158a and FIG. 10 shows an example of an inwardly bent lip 158b. In both cases the lip is bent back so that the edge of the skirt is not in contact with the workpiece. The skirt rim in this case is the base 157a, 157b of the lip which is in contact with the reverse face of the workpiece.

In the embodiments of FIGS. 4A-C, 4D-F, FIGS. 6A-C and FIGS. 7A-C the barrier 33, 153, 263 springs back to its fully expanded state after passing through the workpiece. However it is not necessary to do so—in other words the barrier 33, 153, 263 may only partially spring back. In this case the flange 25, 125, 225 will push the skirt out radially as the sleeve expands.

In the embodiments described above, the shaft 3, 211, 205, 207 and the sleeve 3a, 103a, 209a, 205a, 207a are typically made of metallic materials. The barrier 13, 33, 153, 253 is typically made of a different material to the shaft 3, 103, 203 and a different material to the sleeve 3a, 103a, 203a.

The barrier is preferably made from an electrically insulating material, such as a polymer material.

By way of example, the barrier 13, 33, 153, 263 may be made from Nylon, acrylonitrile butadiene styrene (ABS), polyethylene, thermoplastic elastomer (TPE or TPE) or another polymer material, optionally fabric reinforced.

In the embodiments described above, the barrier 13, 33, 153, 263 forms a sealed cover around the tail of the blind fastener. This enables the barrier 13, 33, 153, 263 to contain any ignition hazards (such as sparking or ejection of hot gas/particles) which are generated at the blind fastener. If a sealed air pocket 27, 127, 227 is present, then this provides a sealed chamber of compressible gas that can contain any ignition hazards.

Figure 11:
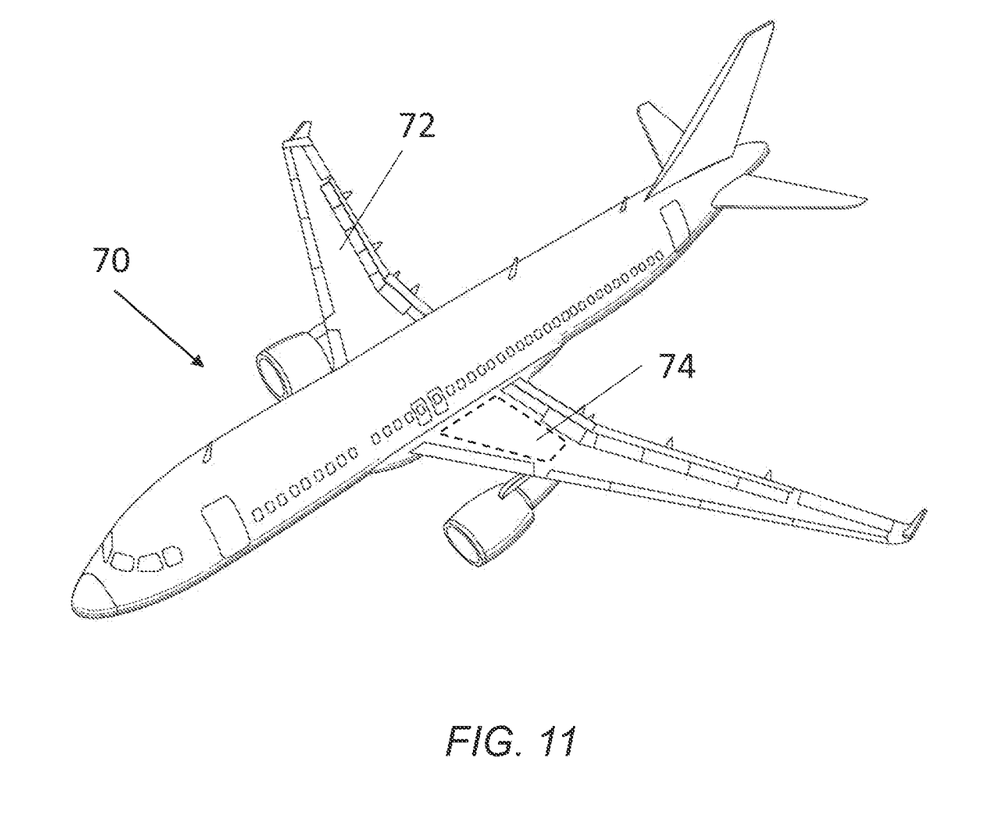
FIG. 11 shows an aircraft which can incorporate any of the blind fasteners.

The blind fasteners 1, 1a, 1b, 101, 201 may be used in any application, but most preferably the blind fastener is used in an aircraft such as the aircraft 70 shown in FIG. 11. The wings 72 of the aircraft contain fuel tanks, one of which is indicated at 74 in FIG. 11. The upper and lower boundaries of the tank are provided by upper and lower skins of the wing, and the fore and aft boundaries are provided by forward and rear spars of the wing. In the embodiments described above, the barrier and the tail of the blind fastener may be within the interior of the fuel tank 74 so that the barrier contains ignition hazards within the full tank. The interior 75 of the fuel tank 74 is indicated in FIGS. 2C, 4C, 4F, 6C and 7C.

The workpiece is illustrated in the FIGS. 2A-C, 4A-F and 6A-C as a single component 23 for ease of illustration, but in practice the workpiece will typically comprise a pair of components which are joined together by the blind fastener as indicated by the two-component workpiece 123 in FIGS. 7A-C. For example the two components of the workpiece may be a wing skin and a wing rib, a wing spar and a wing rib, or a wing spar and a wing skin.

In the embodiments described above, the barrier is secured to the sleeve and/or secured to the tail of the shaft. In other embodiments the barrier may be secured to another part of the tail of the blind fastener.

In the embodiments described above, the barrier is configured to be forced against the face of the workpiece by the tail of the blind fastener to form the sealed cover around the tail of the blind fastener. In other embodiments, the barrier may be forced against the face of the workpiece by another component of the blind fastener.

In the embodiments described above, the head of the blind fastener is part of the shaft or part of the sleeve. In other embodiments, the head of the blind fastener may be provided by another component.

In some of the embodiments described above, the tail of the shaft has an external thread, the sleeve has an internal thread which engages with the external thread of the tail of the shaft, and the sleeve is configured such that a relative rotation between the threads causes the sleeve to expand away from the tail of the shaft to form the expanded sleeve. In other embodiments, such as FIG. 7A, the sleeve and shaft may be unthreaded.

In the embodiments described above, the barrier comprises a skirt with a skirt rim, and the skirt rim is forced against the reverse face of the workpiece to form a seal between the skirt rim and the reverse face of the workpiece. In other embodiments the skirt may have no rim, or another part of the barrier may be forced against the reverse face of the workpiece.

In some of the embodiments described above, the barrier comprises a cap or sheath which is secured to the tail of the blind fastener. In these embodiments the cap or sheath comprises an apex and a skirt, the tail of the blind fastener has sides and an end, the sides of the tail are covered by the skirt, and the end of the tail is covered by the apex. That is, the cap or sheath fully covers the tail of the blind fastener. In other embodiments (for example FIG. 6C) the barrier may consist only of a skirt so only part of the tail of the blind fastener is covered by the barrier.

In the embodiments described above, the barrier is configured to expand (plastically and/or elastically) away from the tail of the shaft to form an expanded barrier as the sleeve expands away from the tail of the shaft. In other embodiments, the barrier may not expand during installation.

In the embodiments described above, the barrier is configured to deform (plastically and/or elastically) radially towards or away from the tail of the shaft. In other embodiments, the barrier may not deform during installation.

In the embodiments described above, the barrier has a skirt with a skirt rim which is separated from the sleeve by a gap. Optionally the barrier is configured to contract towards the sleeve to at least partially close the gap. This makes it easier to insert the barrier through a workpiece.

In the embodiments described above, the barrier is secured to the tail of the blind fastener by an interference fit, an adhesive bond, a snap-fit joint, a thermoplastic weld, or a fastener or other mechanical means. In general terms any type of connection may be used which enables the barrier to be pulled by the tail of the blind fastener into sealing engagement with the reverse face of the workpiece.

In some embodiments described above, the blind fastener has an axial cavity, typically an air cavity 34, between an apex 35 of the barrier and an end face 8 of the tail of the blind fastener. This may provide the clearance required to enable the barrier to move axially during installation.

In one embodiment described above, the blind fastener comprises a sealant, typically an uncured sealant, between the barrier and the tail of the blind fastener. In other embodiments the blind fastener has no sealant.

In some embodiments described above, barrier comprises a skirt and the blind fastener further comprises a pocket 27, 127, 227 between the skirt and the tail of the blind fastener. The pocket may be an air pocket, and the air pocket may be sealed in the installed joint.

In the embodiments described above, the blind fastener is tightened by rotating or pulling the shaft. In other embodiments, the blind fastener may be tightened in some other way, for instance by rotating or pulling the sleeve or another part of the blind fastener.

In the embodiments described above, the expanded sleeve comprises a folded bulb or flange. Alternatively the expanded sleeve may have a different geometry.

In the embodiments described above, the barrier is held by the tail of the blind fastener in a state of compression which causes the skirt rim to apply a sealing force to the face of the workpiece. In other embodiments, the skirt rim may be in contact with the workpiece without applying a sealing force.

In some embodiments, the barrier is in an expanded state before it is passed through the workpiece; in an elastically compressed state as it passes through the workpiece; and springs at least partially back towards its expanded state after it has passed through the workpiece. In other embodiments the barrier is not compressed as it passes through the workpiece.

Examples of suitable blind fasteners to which a barrier sheath, barrier cap or barrier skirt can be secured to form a blind fastener according to the present invention include the OSI-Bolt® manufactured by Monogram Aerospace Fasteners; Composi-Lok® manufactured by Monogram Aerospace Fasteners; Radial-Lok® manufactured by Monogram Aerospace Fasteners; Ergotech® manufactured by Arconic; and Optiblind™ manufactured by Lisi Aerospace.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A blind fastener comprising:
a head;
a shaft with a tail;
a tail of the blind fastener comprising
the tail of the shaft and
a sleeve surrounding the tail of the shaft; and
a barrier secured to the tail of the blind fastener, wherein the sleeve is configured to expand away from the tail of the shaft to form an expanded sleeve which is forced against a face of a workpiece to clamp the workpiece between the head and the expanded sleeve,
wherein when the fastener is rotated, the barrier forms a flared part comprising a deformed portion and a sealing portion, wherein the sealing portion is configured to be forced against the face of the workpiece to form a sealed cover around the tail of the blind fastener.

2. A blind fastener according to claim 1, wherein the barrier comprises a skirt with a skirt rim, and the skirt is configured to force the skirt rim against the face of the workpiece to form a seal between the skirt rim and the face of the workpiece.

3. A blind fastener according to claim 1, wherein the barrier comprises a cap or sheath with a skirt and an apex, the tail of the blind fastener has sides and an end, the sides of the tail are covered by the skirt, and the end of the tail is covered by the apex.

4. A blind fastener according to claim 1, wherein the barrier is configured to deform radially towards or away from the tail of the shaft.

5. A blind fastener according to claim 1, wherein the barrier is configured to expand plastically and/or elastically away from the tail of the shaft to form an expanded barrier.

6. A blind fastener according to claim 1, wherein the barrier has a skirt with a skirt rim which is separated from the sleeve by a gap, and the skirt is configured to contract towards the sleeve to at least partially close the gap.

7. A blind fastener according to claim 1, wherein the barrier is secured to the tail of the blind fastener by an interference fit, an adhesive bond, or a snap-fit joint.

8. A blind fastener according to claim 1, wherein the barrier has an apex, and the blind fastener further comprises an axial cavity between the apex of the barrier and the tail of the blind fastener.

9. A blind fastener according to claim 1, further comprising a sealant between the barrier and the tail of the blind fastener.

10. A blind fastener according to claim 1, wherein the barrier comprises a skirt and the blind fastener further comprises a pocket between the skirt and the tail of the blind fastener.

11. A method of installing a blind fastener, the blind fastener comprising: a head; a shaft with a tail; a tail of the blind fastener comprising the tail of the shaft and a sleeve surrounding the tail of the shaft; and a barrier secured to the tail of the blind fastener, the method comprising the steps of:
a. passing the barrier and the tail of the blind fastener through a workpiece; and
b. tightening the blind fastener so that:
i. the sleeve expands away from the tail of the shaft to form an expanded sleeve;
ii. the expanded sleeve is forced against a face of the workpiece to clamp the workpiece between the head and the expanded sleeve, and
iii. the barrier is forced against the face of the workpiece so that the barrier forms a sealed cover around the tail of the blind fastener.

12. A method according to claim 11, wherein the barrier comprises a skirt with a skirt rim, and the skirt rim is forced against the face of the workpiece to form a seal between the skirt rim and the workpiece.

13. A method according to claim 1, wherein as the sleeve expands away from the tail of the shaft to form the expanded sleeve, the barrier expands elastically or plastically away from the tail of the shaft to form an expanded barrier.

14. A method according to claim 11, wherein the barrier is in an expanded state before step a.; the barrier is in an elastically compressed state as it passes through the workpiece in step a.; and the barrier springs at least partially back towards its expanded state after it has passed through the workpiece in step a.

15. A method according to claim 1, wherein the barrier comprises a skirt and the blind fastener comprises a pocket between the skirt and the tail of the blind fastener, wherein an uncured sealant flows into the pocket as the blind fastener is tightened, and the uncured sealant cures in the pocket to bond the skirt to the tail of the blind fastener and/or to bond the skirt to the workpiece.

16. A joint comprising:
a workpiece;
a blind fastener comprising:
a head;
a shaft with a tail;
a tail comprising the tail of the shaft and a sleeve surrounding the tail of the shaft; and a barrier secured to the tail of the blind fastener,
wherein the sleeve has an expanded part in contact with a face of a workpiece to clamp the workpiece between the head and the sleeve,
wherein the barrier comprises a skirt with a skirt rim in contact with the face of the workpiece to form a sealed cover around the tail of the blind fastener, and
wherein the skirt rim is held by the tail of the blind fastener in a state of compression by the blind fastener which causes the skirt rim to apply a sealing force to the face of the workpiece.

17. A joint according to claim 16, further comprising a sealed air pocket between the skirt and the tail of the blind fastener.

18. A joint according to claim 16, further comprising a cured sealant which bonds the skirt to the tail of the blind fastener and/or bonds the skirt to the workpiece.

19. An aircraft fuel tank comprising a joint according to claim 16, wherein the aircraft fuel tank has an interior, and the skirt and tail of the blind fastener are within the interior of the aircraft fuel tank.

20. An aircraft comprising an aircraft fuel tank according to claim 19.

* * * * *